3,462,446
SUBSTITUTED β-AMINO-2-STILBAZOLE
COMPOUNDS
Horace A. De Wald, Ann Arbor, Mich., assignor to
Parke Davis & Company, Detroit, Mich., a corporation of Michigan
No Drawing. Filed Nov. 25, 1966, Ser. No. 596,807
Int. Cl. C07d 31/42, 31/44, 57/00
U.S. Cl. 260—295                                    5 Claims

ABSTRACT OF THE DISCLOSURE

β - Amino-α-[p-(tertiary aminoalkyl)phenoxy]-2-stilbazoles substituted at the 2′-position and optionally substituted elsewhere; trifluoroacetyl derivatives; and acid-addition salts. The compounds have pharmacological properties, specifically as anti-estrogenic, anti-progestational, hypocholesteremic, and anti-fertility agents. They can be produced by (a) reacting a benzonitrile with a reactive metal derivative of an aryloxymethylpyridine compound and hydrolyzing the product, or (b) reacting a primary amine with a reactive derivative of trifluoroacetic acid.

---

The present invention relates to new aminoalkyl ethers. More particularly, it relates to new substituted α-[p-(aminoalkoxy)phenoxy]-2-stilbazole compounds, to acid-addition salts thereof, and to methods for their production.

In the forms of their free bases, the compounds of the invention can be represented by the structural formula

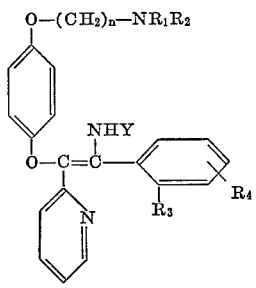

In this formula Y represents hydrogen or trifluoroacetyl (—COCF$_3$); $n$ is 2 or 3; each of R$_1$ and R$_2$ represents lower alkyl, or R$_1$ and R$_2$ are combined and together represent lower alkylene of 4, 5, 6, 7, or 8 carbon atoms, 4 or 5 of which carbon atoms are in annular position with the nitrogen atom to which they are attached; R$_3$ represents halogen, lower alkyl, lower alkenyl, lower alkoxy, or trifluoromethyl; and R$_4$ represents hydrogen, halogen, lower alkyl, lower alkoxy, or trifluoromethyl, said R$_4$ being substituted at the 3′- or 4′-position. When R$_1$ and R$_2$ are combined and represent lower alkylene, the group —NR$_1$R$_2$ represents a pyrrolidino, lower alkylpyrrolidino, piperidino, or lower alkylpiperidino radical. In the compounds of the invention, the preferred lower alkyl groups are methyl and ethyl; the preferred lower alkoxy groups are methoxy nad ethoxy; and the preferred halogen is chlorine.

Although in the foregoing general formula the compounds of the invention are represented as having an amine structure, this is only one of the equivalent tautomeric forms in which these compounds can exist. The facile interconversion between tautomeric forms of the compounds of the invention is illustrated by the following equation.

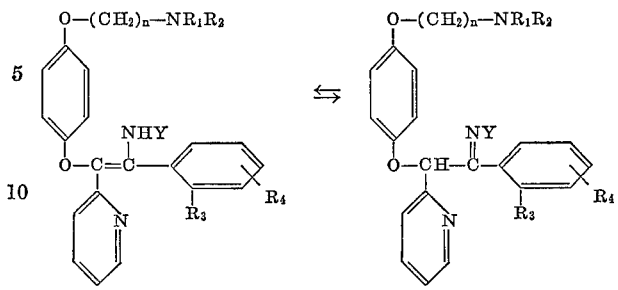

cis and trans isomers

In any particular compound of the invention, one of the indicated tautomeric forms, that is the imine, the cis enamine or the trans enamine, may be favored by such factors as acidic or basic conditions or solvent. For reasons of convenience, the compounds of the invention are consistently formulated and named as having the amine structure but because of the equilibrium state which can exist among the tautomeric forms, it will be appreciated that the amine structure includes the various tautomers indicated above. For purposes of chemical nomenclature, the compounds of the invention can be regarded as amino derivatives of 2-stilbazole,

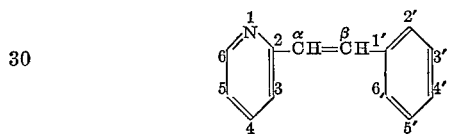

In accordance with the invention, the primary amines of the invention, that is, the compounds wherein Y represents hydrogen, are produced by reacting a benzonitrile compound of the formula

with a reactive metal derivative of an aryloxymethylpyridine compound of the formula

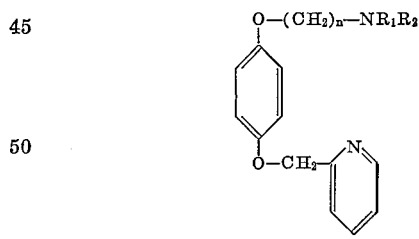

under anhydrous conditions, followed by hydrolysis of the resulting reaction product; where $n$, R$_1$, R$_2$, R$_3$, and R$_4$ are as defined before. Some examples of suitable reactive metal derivatives are the lithium, sodium, and magnesium halide derivatives. The preferred reactive metal derivatives are the alkali metal derivatives which can be prepared by reacting the aryloxymethylpyridine compound with such reagents as phenyllithium, butyllithium, lithium hydride, sodium hydride, sodamide, or lithium diisopropylamide. Of the preferred alkali metal derivatives, the lithium derivative is the most suitable. If the magnesium halide derivative is desired, it can be obtained by reaction of an alkali metal derivative with a magnesium halide. The first phase of the process is carried out by reacting the benzonitrile compound with a reactive metal derivative, such as the lithium derivative, of the aryloxymethylpyridine compound under anhydrous conditions. This phase of the process is normally carried out in a non-hydroxylic solvent.

The benzonitrile compound and the reactive metal derivative of the aryloxymethylpyridine compound are usually employed in approximately equimolar quantities although, if desired, an excess of either can be used. Some examples of suitable non-hydroxylic solvents are ethers such as diethyl ether, dibutyl ether, diisopropyl ether, tetrahydrofuran, or diethylene glycol dimethyl ether; ether-hydrocarbon mixtures; tertiary amides such as dimethylformamide or N-methyl-2-pyrrolidone; tertiary amines such as triethylamine; or liquid ammonia. The preferred solvents are ethers. If desired, the reactive metal derivative of the aryloxymethylpyridine compound can be formed directly in the reaction mixture and used without isolation. The reaction of the benzonitrile compound with the reactive metal derivative of the aryloxymethylpyridine compound proceeds at a satisfactory rate at room temperature or below although a temperature within the range of about −70° C. to 110° C. or the reflux temperature of the solvent can be used. Preferably the reaction is carried out at reflux in a low boiling ether at about 35–65° C. Depending upon the temperature, the time required for substantial completion of the reaction varies between about 30 minutes and 24 hours. In the preferred temperature range, the reaction between the benzonitrile compound and the reactive metal derivative of the aryloxymethylpyridine compound is usually substantially complete within three hours. The desired product is then obtained following hydrolysis of the reaction mixture with water or other aqueous medium, such as ammonium chloride solution. To avoid excessive hydrolysis with formation of other products, the hydrolysis is carried out under mild conditions and prolonged contact with a strongly acidic or strongly basic hydrolysis medium is avoided.

The benzonitrile compounds employed as starting materials are already known in some cases and in other cases can be prepared by any of a variety of methods. For example, methyl o-chlorobenzoate is reacted with methylmagnesium iodide in ether and the product hydrolyzed to give 2-(o-chlorophenyl)-2-propanol. The latter compound is dehydrated with hydrochloric acid in acetic acid to give 2-(o-chlorophenyl)-1-propene which is reacted with cuprous cyanide to produce o-isopropylbenzonitrile. The aryloxymethylpyridine compounds employed as starting materials can be obtained by reacting p-benzyloxyphenol with an aminoalkyl halide of the formula

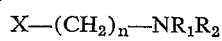

in the presence of sodium hydride to produce an aminoalkyl ether of the formula

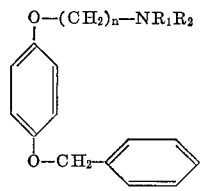

The latter compound is debenzylated with hydrogen in the presence of a palladium catalyst to give a compound of the formula

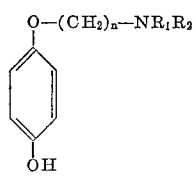

which is then reacted with 2-chloromethylpyridine in the presence of sodium hydride and the product hydrolyzed to give the aryloxymethylpyridine compound employed as starting material. Alternatively, p-benzyloxyphenol is reacted with 2-chloromethylpyridine in the presence of sodium hydride to produce 2-(p-benzyloxyphenoxy)methylpyridine, which is converted by reaction with hydrochloric acid in acetic acid to 2-(p-hydroxyphenoxy)methylpyridine. This product is reacted with an aminoalkyl halide of the formula $$X—(CH_2)_n—NR_1R_2$$

in the presence of sodium hydride and the product hydrolyzed to produce the aryloxymethylpyridine compound employed as starting material. In the foregoing formulas, X represents halogen, preferably chlorine or bromine, and $n$, $R_1$, and $R_2$ are as defined before.

The trifluoroacetamide compounds of the invention, that is the compounds wherein Y represents trifluoroacetyl, are produced by reacting a compound which can be represented by the formula

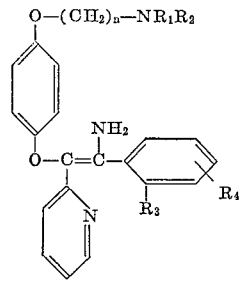

or a reactive metal derivative thereof with a reactive derivative of trifluoroacetic acid; where $n$, $R_1$, $R_2$, $R_3$, and $R_4$ are as defined before. Some examples of suitable reactive metal derivatives of the primary amine shown above are the alkali metal derivatives and the magnesium halide derivatives. The substance being acylated, although for convenience represented in the foregoing formula as having the structure of a primary amine, can also exist in the equivalent imine tautomeric form. Some examples of suitable reactive derivatives of trifluoroacetic acid are the halides, especially the chloride, and the anhydride. At least an equimolar amount and preferably up to a moderate excess of the reactive derivative of trifluoroacetic acid is used. The reaction can be carried out in any of a variety of non-hydroxylic solvents such as diethyl ether, 1,2-dimethoxyethane, dioxane, tetrahydrofuran, benzene, toluene, xylene, chlorobenzene, trichloroethane, carbon tetrachloride, chloroform, dimethylformamide, N-methyl-2-pyrrolidone, dimethyl sulfoxide, ethyl acetate, or other non-hydroxylic solvents. A preferred solvent is ethyl acetate. It is desirable to add at least one equivalent of a tertiary amine such as triethylamine, N,N-dimethylaniline or pyridine to function as an acid acceptor. An excess of tertiary amine or trifluoroacetic anhydride can also be used as a solvent. The reaction proceeds readily at room temperature or below and is usually carried out in the temperature range from −10° C. to 50° C., most commonly between 0° C. and 15° C. Under these conditions a good yield of product is obtained in less than an hour but the reaction may be continued for a longer time, for example up to 24 hours, to ensure a substantially complete reaction.

Where a reactive metal derivative of the amine, such as the lithium derivative, is desired as a starting material in the foregoing process, it can be obtained by reaction of the amine with a strong base or produced in situ by omitting the hydrolysis step following the reaction of a benzonitrile compound with a reactive metal derivative of an aryloxymethylpyridine compound.

The free bases of the invention form acid-addition salts with a variety of inorganic and organic acids. Pharmaceutically-acceptable acid-addition salts are formed with acids such as hydrochloric, hydrobromic, hydriodic, sulfuric, acetic, benzoic, citric, maleic, malic, gluconic, ascorbic, pamoic, and related acids. An excess of strong acid is avoided during salt formation. The free bases and acid-addition salts are generally equivalent for the purposes of the invention except that one or the other may be preferred for particular solubility properties.

The compounds of the invention are useful as pharmacological agents and as chemical intermediates. They exhibit anti-estrogenic, anti-progestational, hypocholesteremic, and anti-fertility activities. Their activity as hypocholesteremic agents can be demonstrated, and measured quantitatively, by administering the compounds at intervals over a period of time and observing the decrease in the level of blood cholesterol. The compounds of the invention are active upon oral administration but can also be given by the parenteral route if desired. With respect to their pharmacological activities, some preferred compounds of the invention are those in which Y represents hydrogen and in which the 2'-position is substituted by methyl or chlorine and the 4'-position is substituted by chlorine.

The invention is illustrated by the following examples.

EXAMPLE 1

A solution of 19.5 g. of 2-[p-(2-diethylaminoethoxy)-phenoxy]methylpyridine in 75 ml. of ether is added to a stirred solution of phenyllithium prepared from 1.5 g. of lithium and 16 g. of bromobenzene in 100 ml. of ether. The resulting reaction mixture contains the lithium derivative of 2-[p-(2-diethylaminoethoxy)phenoxyl]-methylpyridine. Ten minutes later a solution of 7.6 g. of o-chlorobenzonitrile in 50 ml. of ether is added and the mixture is heated at reflux for 3 hours, cooled to room temperature, and stirred with 120 ml. of saturated ammonium chloride solution. The ether phase is separated, washed with saturated sodium chloride solution, dried over magnesium sulfate, and evaporated to give a residue of β - amino - 2' - chloro-α-[p-(2-diethylaminoethoxy)-phenoxy]-2-stilbazole. A monocitrate (the salt with 1 mole of citric acid) is obtained as follows. A solution of 13 g. of the free base in 50 ml. of methyl ethyl ketone is added to a hot solution of 6.5 g. of citric acid in 75 ml. of methyl ethyl ketone. The insoluble monocitrate is collected after it crystallizes; M.P. 78–80° C. A salt with maleic acid is obtained by mixing equimolar amounts of the free base and maleic acid in methanol solution and evaporating the solution to dryness. A hydrochloride is obtained by dissolving the free base in ether containing a small amount of methanol and adding the calculated amount (1 mole) of hydrogen chloride. An excess of hydrogen chloride is avoided.

The following additional compounds are prepared by using the foregoing general procedure, but with the substitution of the appropriate 2-(substituted phenoxy)-methylpyridine and/or the appropriate substituted benzonitrile. In the case of difficultly-soluble materials, tetrahydrofuran can be substituted for part or all of the ether used as solvent.

From 2 - [p - (2 - piperidinoethoxy)phenoxy]methylpyridine and o-chlorobenzonitrile, the product is β-amino-2' - chloro - α - [p - (2 - piperidinoethoxy)phenoxy] - 2-stilbazole; M.P. 110–113° C. following crystallization from methanol.

From 2 - [p - (3 - dimethylaminopropoxy)phenoxy]-methylpyridine and o-chlorobenzonitrile, the product is β - amino - 2' - chloro - α - [p - (3 - dimethylaminopropoxy)phenoxy]-2-stilbazole. For purification the crude product is dissolved in ether-tetrahydrofuran and fractionated on a chromatography column prepared with activated magnesium silicate. The monocitrate is obtained by reaction with citric acid in methyl ethyl ketone; M.P. 92–95° C.

From 2 - [p - (2 - diethylaminoethoxy)phenoxy]methylpyridine and o-methylbenzonitrile, the product is β-amino - 2' - methyl - α - [p - (2 - diethylaminoethoxy) phenoxy]-2-stilbazole. For purification the crude product is dissolved in ether and fractionated on a chromatography column prepared with activated magnesium silicate. In order to produce the monocitrate, 18 g. of the free base is dissolved in 40 ml. of methanol containing 6 g. of citric acid. The mixture is diluted with 600 ml. of ethyl acetate and the solution is removed by decantation from a gummy product, which may separate initially. The monocitrate crystallizes from the solution upon cooling; M.P. 80–83° C.

From 2 - [p - (2 - pyrrolidinoethoxy)phenoxy]methylpyridine and o-isopropenylbenzonitrile, the product is β - amino - 2' - isopropenyl - α - [p - (2 - pyrrolidinoethoxy)phenoxy]-2-stilbazole. The monocitrate is obtained by reacting the free base with citric acid in methyl ethyl ketone; M.P. 75° C.

From 2 - [p - (2 - pyrrolidinoethoxy)phenoxy]methylpyridine and o-trifluoromethylbenzonitrile, the product is β - amino - 2' - trifluoromethyl - α - [p - (2 - pyrrolidinoethoxy)-phenoxy]-2-stilbazole; M.P. 56–58° C. following crystallization from benzene-petroleum ether.

From 2 - [p - (2 - pyrrolidinoethoxy)phenoxy]methylpyridine and 2,4-dichlorobenzonitrile, the product is β-amino - 2',4' - dichloro - α - [p - (2 - pyrrolidinoethoxy)phenoxy]-2-stilbazole; M.P. 63–65° C. following crystallization from petroleum ether.

From 2 - [p - (2 - diethylaminoethoxy)phenoxy]methylpyridine and 2,4-dichlorobenzonitrile, the product is β-amino - 2',4' - dichloro - α - [p - (2 - diethylaminoethoxy) phenoxy]-2-stilbazole. The monocitrate is obtained by reaction with citric acid in methyl ethyl ketone; M.P. 95° C.

From 2 - [p - (3 - dimethylaminopropoxy)phenoxy] methylpyridine and 2 - methyl - 3 - chlorobenzonitrile, the product is β - amino - 2' - methyl - 3' - chloro - α - [p-(3 - dimethylaminopropoxy)phenoxy] - 2 - stilbazole. The monocitrate is obtained by reacting the free base with citric acid in acetone-ether; M.P. indefinite at 70–95°C.

From 2 - [p - (3 - dimethylaminopropoxy)phenoxy] methylpyridine and 2 - methyl - 4 - chlorobenzonitrile, the product is β - amino - 2' - methyl - 4' - chloro - α - [p-(3 - dimethylaminopropoxy)phenoxy] - 2 - stilbazole. The monocitrate is obtained by reacting the free base with citric acid in acetone-ether; M.P. 85–90° C.

From 2 - [p - (3 - dimethylaminopropoxy)phenoxy] methylpyridine and 2 - isopropyl - 3 - methoxybenzonitrile, the product is β - amino - 2' - isopropyl - 3'-methoxy - α - [p - (3 - dimethylaminopropoxy)phenoxy] 2-stilbazole. The monocitrate is obtained by reacting the free base with citric acid in acetone-ether; decomposition point 72–75° C.

From 2 - [p - (3 - dimethylaminopropoxy)phenoxy] methylpyridine and 2 - bromo - 4 - methylbenzonitrile, the product is β - amino - 2' - bromo - 4' - methyl - α - [p-(3-dimethylaminopropoxy)phenoxy]-2-stilbazole.

From 2 - [p - (2 - pyrrolidinoethoxy)phenoxy]methylpyridine and 2 - isopropyl - 3 - methoxybenzonitrile, the product is β - amino - 2' - isopropyl - 3' - methoxy - α-[p - (2 - pyrrolidinoethoxy)phenoxy] - 2 - stilbazole. The monocitrate is obtained by reacting the free base with citric acid in acetone-ether; it decomposes at 89° C.

EXAMPLE 2

A solution of 8 g. of diethylamine in 50 ml. of ether is added to 25 g. of an n-butyllithium solution (containing 24% n-butyllithium in heptane) in 100 ml. of ether at −40° C. A solution of 28 g. of 2-[p-(2-pyrrolidinoethoxy)phenoxy]methylpyridine in 50 ml. of ether is added and the reaction mixture allowed to warm to 20° C. A solution of 12 g. of o-chlorobenzonitrile in 50 ml. of ether is then added and the mixture stirred for 24 hours. It is then hydrolyzed by stirring it with saturated ammonium chloride solution. The organic phase is separated, dried over magnesium sulfate, and evaporated to give a residue of β-amino-2'-chloro-α-[p-(2-pyrrolidinoethoxy)phenoxy]-2-stilbazole; M.P. 131–134° C. following crystallization from ether-petroleum ether. A monocitrate (the salt with 1 mole of citric acid) is obtained as follows. A solution of 1 g. of citric acid in 12 ml. of acetone is added to a solution of 2.2. g. of the free base in 10 ml. of acetone. The monocitrate is precipitated by the addition of ether and collected on a filter; decomposition point 95° C.

EXAMPLE 3

With cooling to maintain the temperature between 0–5° C., 3.2 g. of trifluoroacetic anhydride is added dropwise to a suspension of 4.4 g. of β-amino-2′-chloro-α-[p-(2-pyrrolidinoethoxy)phenoxy]-2-stilbazole in 150 ml. of ethyl acetate containing 2.8 ml. of triethylamine. The mixture is then allowed to stand overnight at room temperature, warmed at 90–100° C. for 2 hours, cooled, washed with saturated sodium bicarbonate solution and with saturated sodium chloride solution, and dried over magnesium sulfate. The solvent is evaporated to give a residue of β - trifluoroacetamido-2′-chloro - α - [p-(2-pyrrolidinoethoxy)phenoxy]-2-stilbazole as an oil. A monocitrate (the salt with 1 mole of citric acid) is obtained as follows. A solution of 2.8 g. of the free base in 10 ml. of acetone is treated with a warm solution of 1 g. of citric acid in 10 ml. of acetone. The monocitrate crystallizes from the solution and is collected; M.P. 155–158° C.

By the reaction of β-amino-2′-chloro-α-[p-(2-diethylaminoethoxy)phenoxy]-2-stilbazole with trifluoroacetic anhydride according to the foregoing general procedure, the product is β-trifluoroacetamido-2′-chloro-α-[p-(2-diethylaminoethoxy)phenoxy]-2-stilbazole.

By the reaction of β-amino-2′-methyl-4′-chloro-α-[p-(3-dimethylaminopropoxy)phenoxy]-2-stilbazole with trifluoroacetic anhydride according to the foregoing general procedure, the product is β-trifluoroacetamido-2′-methyl-4′-chloro - α - [p-(3-dimethylaminopropoxy)phenoxy]-2-stilbazole.

Starting materials

With stirring, a solution of 100 g. of p-benzyloxyphenol in 150 ml. of dimethylformamide is added to 25 g. of a 50% sodium hydride-mineral oil dispersion of 120 ml. of dimethylformamide to produce a mixture containing the sodium salt of p-benzyloxyphenol. This mixture is treated with 300 ml. of an ether solution of 2-diethylaminoethyl chloride (prepared by neutralization of an aqueous solution of 100 g. of the hydrochloride, extraction into ether, and drying) and the reaction mixture is heated until low boiling solvent is removed and the temperature reaches 80° C. The mixture is stirred 3 hours at 80° C., diluted with benzene, washed with water and with 1 N sodium hydroxide, dried, and concentrated in vacuo to give a residue of p-(2-diethylaminoethoxy)phenyl benzyl ether; B.P. 190–200° C. at 0.2 mm. Similarly, from 2-pyrrolidinoethyl chloride, the product is p-(2-pyrrolidinoethoxy) phenyl benzyl ether; M.P. 55–57° C. after crystallization from ethyl acetate-petroleum ether.

A mixture of 100 g. of p-(2-diethylaminoethoxy) phenyl benzyl ether and 4 g. of 20% palladium on charcoal catalyst in 1000 ml. of methanol is shaken in a hydrogen atmosphere for 2 hours, or until the calculated amount of hydrogen has been absorbed. The mixture is filtered and the filtrate evaporated to give a residue of p-(2-diethylaminoethoxy)phenol; M.P. 74–77° C. following crystallization from aqueous methanol. Similarly, from p-(2-pyrrolidinoethoxy)phenyl benzyl ether, the product is p-(2-pyrrolidinoethoxy)phenol; M.P. 111–114° C. following crystallization from methanol.

With stirring, a solution of 84 g. of p-(2-diethylaminoethoxy)phenol in 150 ml. of dimethylformamide is slowly added to a suspension of 20 g. of a 50% sodium hydride-mineral oil dispersion of 100 ml. of dimethylformamide. A solution of 2-chloromethylpyridine (prepared from neutralization of an aqueous solution of 66 g. of the hydrochloride, extraction into ether, and drying) in 200 ml. of ether is added and the reaction mixture is heated until low boiling solvent is removed and the temperature reaches 80° C. The mixture is stirred 3 hours at 80° C., cooled, and stirred with ether and water. The organic phase is separated, washed with water and with 1 N sodium hydroxide, dried, and evaporated to give a residue of 2-[p-(2-diethylaminoethoxy)phenoxy]methylpyridine; B.P. 195–205° C. at 0.25 mm. Similarly, from p-(2-pyrrolidinoethoxy)phenol and 2-chloromethylpyridine, the product is 2 - [p - (2-pyrrolidinoethoxy)phenoxy]methylpyridine; M.P. 38–40° C. following crystallization from petroleum ether.

With stirring, 150 ml. of dimethylformamide containing 20 g. of a 50% sodium hydride-mineral oil dispersion is added dropwise to a solution of 80 g. of p-benzyloxyphenol in 100 ml. of dimethylformamide. The resulting mixture containing the sodium salt of p-benzyloxyphenol is treated with 300 ml. of an ether solution of 2-chloromethylpyridine (prepared by dissolving 70 g. of the hydrochloride in 100 ml. of 50% aqueous sodium chloride solution, neutralizing with concentrated sodium hydroxide, extracting into ether, and drying). The reaction mixture is heated until the low boiling solvent is removed and the temperature reaches 80° C. The mixture is stirred 3 hours at 80° C. and is then diluted with 300 ml. of benzene and washed with water, with 1 N sodium hydroxide, and with saturated sodium chloride solution. The organic phase is separated, dried, and concentrated to give a residue of 2-(p-benzyloxyphenoxy)methylpyridine; M.P. 88–90° C. after crystallization from ethyl acetate-petroleum ether.

A mixture of 80 g. of 2-(p-benzyloxyphenoxy)methylpyridine, 400 ml. of glacial acetic acid, and 200 ml. of concentrated hydrochloric acid is heated under reflux for 4 hours and then distilled in vacuo to a small volume. The mixture is diluted with warm water to a volume of 400 ml. and neutralized with excess sodium acetate. The insoluble product is collected and washed with water. It is 2-(p-hydroxyphenoxy)methylpyridine; M.P. 135–137° C. following crystallization from benzene.

A solution of 35.8 g. of 2-(p-hydroxyphenoxy)-methylpyridine in 100 ml. of dimethylformamide is slowly added to a suspension of 9 g. of a 50% sodium hydride-mineral oil dispersion in 100 ml. of dimethylformamide. An ethereal solution of 2-piperidinoethyl chloride (prepared by neutralization of an aqueous solution of 90 g. of the hydrochloride, extraction of the free base into ether, and drying) is added. The reaction mixture is heated at 85° C. for 4 hours, then cooled and stirred with benzene and water. The organic phase is separated and washed with water and with 1 N sodium hydroxide. It is then extracted with 400 ml. of 1 N hydrochloric acid and the acidic aqueous phase is separated, basified to pH 10 with sodium hydroxide, and extracted with benzene. The benzene extract is evaporated to give a residue of 2-[p-(2-piperidinoethoxy)phenoxy]-methylpyridine; M.P. 53–55° C. following crystallization from petroleum ether. Similarly, from 2 - (p-hydroxyphenoxy)-methylpyridine and 3 - dimethylaminopropyl chloride, the product obtained is 2-[p-(3-dimethylaminopropoxy)phenoxy] - methylpyridine; M.P. 29–31° C. after crystallization from petroleum ether. Similarly, from 2-(p-hydroxyphenoxy)-methylpyridine and 2-pyrrolidinoethyl chloride, the product obtained is 2-[p-(2-pyrrolidinoethoxy)phenoxy]methylpyridine; M.P. 38–40° C. after crystallization from petroleum ether. Similarly, from 2-(p-hydroxyphenoxy)methylpyridine and 2-diethylaminoethyl chloride, the product obtained is 2-[p-(2-diethylaminoethoxy)phenoxy]methylpyridine; B.P. 195–205° C. at 0.25 mm.

Methyl iodide, 172.7 g. is added to a mixture of 29.2 g. of magnesium turnings in 600 ml. of ether and the resulting mixture is heated at reflux for 1 hour. A solution of 69 g. of methyl o-chlorobenzoate in 200 ml. of ether is gradually added. The reaction mixture is then heated at reflux 2 more hours, allowed to stand overnight at room temperature, and stirred with saturated ammonium chloride solution. The organic phase is separated, washed with saturated sodium chloride solution, dried over magnesium sulfate, and evaporated to give a residue of 2-(o-chlorophenyl)-2-propanol. For purification, it is distilled; B.P. 57–68° C. at 0 1 mm. A mixture of 49.0 g. of this product, 400 ml. of acetic acid, and 5 ml. of concentrated hydrochloric acid is heated at reflux for 16 hours, cooled, and concentrated in vacuo. The residue is dissolved in ethyl acetate and washed with saturated sodium chloride solution, with saturated sodium bicarbonate solution, and again with saturated sodium chloride solution. The organic phase is dried and evaporated to give a residue of 2-(o-chlorophenyl)-1-propene, suitable for use without further purification. A mixture of 25 g. of this product, 16.4 g. of cuprous cyanide, and 70 ml. of N-methyl-2-pyrrolidone is heated at reflux for 16 hours and then poured into a warm solution of 60 ml. of ethylenediamine and 180 ml. of water. This mixture is extracted with 600 ml. of benzene in two portions. The benzene extract is evaporated and the residue distilled in vacuo. The product is o-isopropenylbenzonitrile; B.P. 85–98° C. at 15 mm.

I claim:

1. A member of the class consisting of compounds of the formula

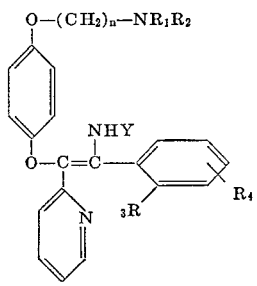

and pharmaceutically-acceptable acid-addition salts thereof, where Y is a member of the class consisting of hydrogen and trifluoroacetyl; $n$ is a member of the class consisting of 2 and 3; $R_1$ and $R_2$ are members of the class consisting of lower alkyl and further members wherein $R_1$ and $R_2$ are combined and together represent tetramethylene or pentamethylene; $R_3$ is a member of the class consisting of halogen, lower alkyl, lower alkenyl, lower alkoxy, and trifluoromethyl; and $R_4$ is a member of the class consisting of hydrogen, halogen, lower alkyl, lower alkoxy, and trifluoromethyl, said $R_4$ being substituted at the 3′- or 4′-position.

2. A compound according to claim 1 wherein Y is hydrogen.

3. A compound according to claim 1 which is a pharmaceutically-acceptable acid-addition salt of β-amino-2′,4′ - dichloro- α -[p-(2-pyrrolidinoethoxy)phenoxy]-2-stilbazole.

4. A compound according to claim 1 which is a pharmaceutically-acceptable acid-addition salt of β-amino-2′,4′-dichloro-α-[p-(2-diethylaminoethoxy)phenoxy] - 2 - stilbazole.

5. A compound according to claim 1 which is a pharmaceutically-acceptable acid-addition salt of β-amino-2′-methyl - 4′ - chloro-α-[p-(3-dimethylaminopropoxy)phenoxy]-2-stilbazole.

References Cited
UNITED STATES PATENTS
3,156,698  11/1964  De Wald et al. _____ 260—296

HENRY R. JILES, Primary Examiner

A. L. ROTMAN, Assistant Examiner

U.S. Cl. X.R.

260—294, 294.7, 296, 297, 326.5, 465, 999